May 23, 1972   F. O. MILLER   3,664,800
MOLDING OF THREADED CAPS
Filed June 25, 1969   2 Sheets-Sheet 1

INVENTOR.
FREDERICK O. MILLER
BY
Learman, Learman & McCulloch

May 23, 1972  F. O. MILLER  3,664,800
MOLDING OF THREADED CAPS

Filed June 25, 1969  2 Sheets-Sheet 2

INVENTOR.
FREDERICK O. MILLER
BY
Learman, Learman & McCulloch

3,664,800
MOLDING OF THREADED CAPS
Frederick O. Miller, Saginaw, Mich., assignor to Miller Mold Company, Saginaw, Mich.
Filed June 25, 1969, Ser. No. 836,255
Int. Cl. B29c 17/04; B29h 3/044
U.S. Cl. 425—391                7 Claims

ABSTRACT OF THE DISCLOSURE

A mold for forming a molded plastic cap having a skirt provided with a helically threaded portion and axially ribbed gripping portion characterized in that the mold has a cavity provided with a helically threaded side wall and an axially grooved annulus rotatably accommodated in the cavity.

---

The invention disclosed herein relates to the molding of threaded, plastic caps of the kind adapted for removable assembly with a container such as a jar or bottle having a threaded outlet and more particularly to the molding of a threaded, plastic cap having axially extending ribs and grooves which facilitate rotation of the cap relative to the container.

It is conventional practice to provide a jar, bottle or other container with a threaded neck or outlet on which a correspondingly threaded, plastic cap is adapted to be fitted so as to provide a removable closure for the container. Such a cap may be formed economically by a vacuum molding process in which a heated sheet of thermoplastic material such as polypropylene, polyethylene, polyvinyl chloride, and the like, is placed in overlying relation to a mold having a plurality of cavities from which air is exhausted so as to deform the plastic material into the cavities. Each cavity is provided with a helically threaded side wall against which the plastic material seats so as to mold from the plastic sheet an article the outer surface of which corresponds to the inner surface of the mold cavity. Thus, the molded article has an end wall surrounded by an annular skirt in which a helical thread is molded.

Plastic caps of the kind referred to have smooth outer surfaces which make it difficult to effect rotation of the cap to and from sealing relation with the container on which the cap is mounted. This problem can be overcome by knurling or grooving the cap at some part of its outer surface, but if the grooves are formed in the same operation as that in which the cap itself is formed, then it has not been possible heretofore to remove the formed cap from the mold cavity by relative rotation thereof, because relative rotation between the formed cap and the mold cavity would shear the material from between adjacent grooves, thereby destroying the cap itself.

An object of this invention is to provide a mold construction which makes it possible to mold in a single operation a cup-shaped cap having a threaded skirt and axially extending ribs and grooves.

Another object of the invention is to provide a mold of the character described and wherein the formed cap can be removed from the mold by relative rotation between the latter and the cap and without any adverse effect on the cap.

A further object of the invention is to provide a mold of the kind referred to which is adaptable to presently used molding apparatus and methods by relatively little modification of such apparatus.

Another object of the invention is to provide an improved method of molding plastic caps having an annular skirt provided with a threaded wall portion and an axially grooved portion.

Other objects and advantages of the invention will be pointed out specifically or will become apparent from the following description when it is considered in conjunction with the appended claims and the accompanying drawings, in which:

Figure 1:
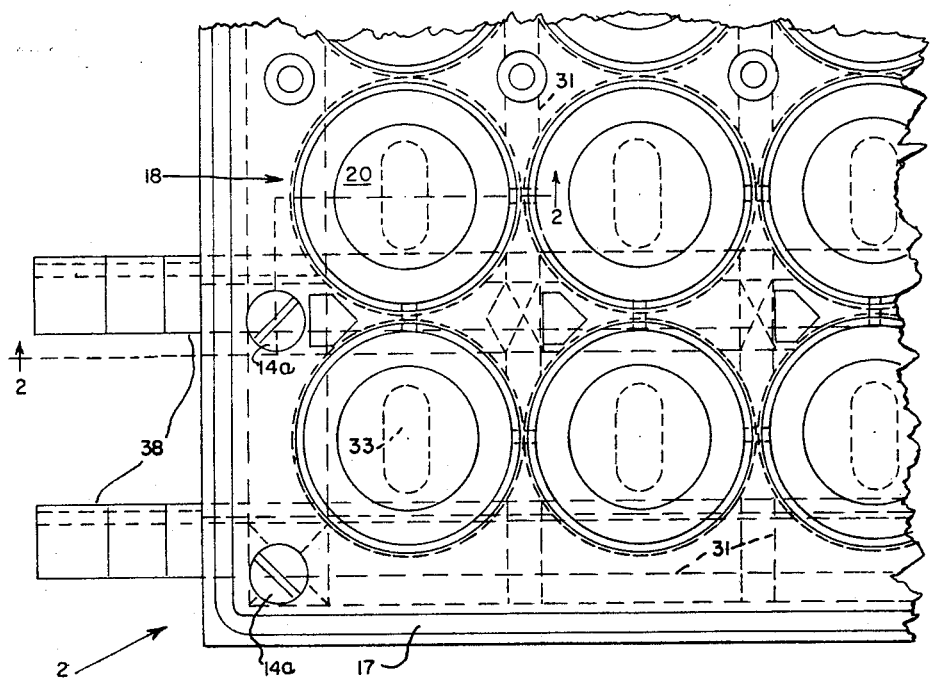
FIG. 1 is a fragmentary, top plan view of a multiple cavity mold half constructed in accordance with the invention.

A mold constructed according to the invention comprises a base member 1 and a cover member 2 that is adapted to be moved vertically relatively to the base 1 so as to clamp and release between the members 1 and 2 a sheet 3 of thermoplastic material. The cover 2 has a smooth peripheral edge 4 which surrounds a relieved central portion 5 and may be moved vertically by means of a plurality of upstanding posts, one of which is shown at 6 in FIG. 2.

Figure 2:
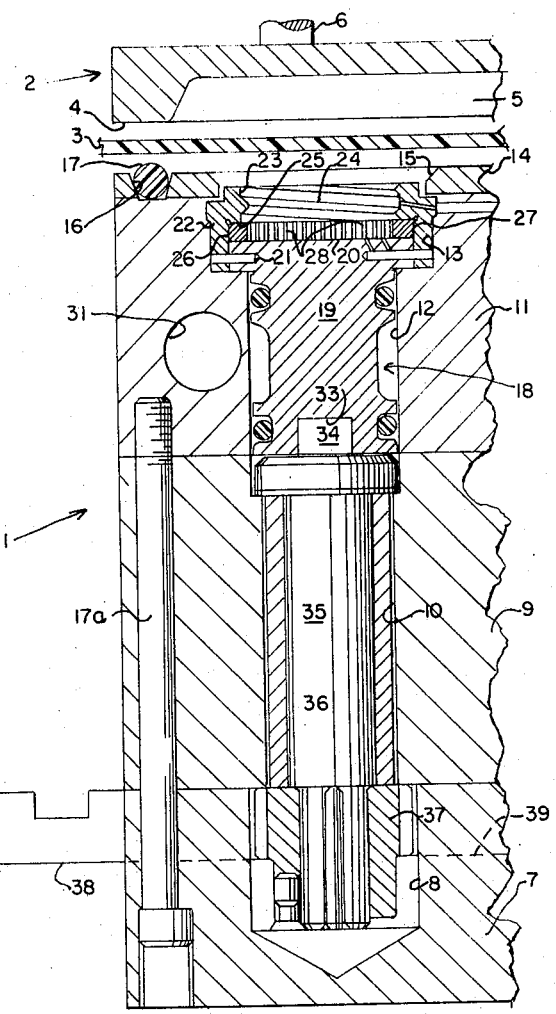
FIG. 2 is a sectional view taken on the line 2—2 of FIG. 1, and illustrating the plastic sheet and the upper and lower mold members.
Figure 5:
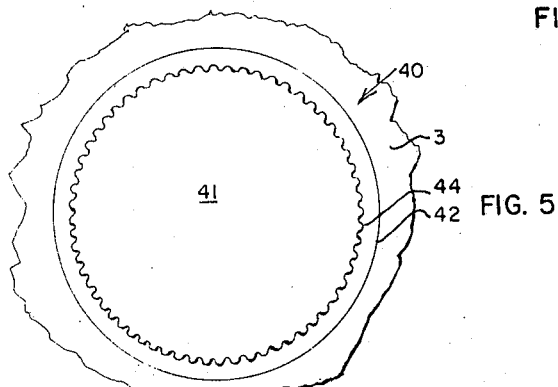
FIG. 5 is a top plan view of a cap molded in accordance with the invention.

The base 1 comprises a bottom member 7 that is adapted to rest on a suitable support (not shown), the bottom member being provided with a plurality of upwardly facing openings, one of which is shown at 8 in FIG. 2. Mounted atop the bottom member 7 is an intermediate member 9 having a number of bores 10 corresponding to the number of openings 8 and in axial alignment with the latter. Atop the intermediate member 9 is an upper member 11 having a plurality of bores 12 therein corresponding in number to the number of bores 10 and in axial alignment therewith. The upper end of the bore 12 is enlarged as at 13. Atop the upper member 11 is a plate 14 having openings 15 therein aligned with the counterbores 13. The plate 14 is provided at its marginal edges with a groove 16 in which a sealing ring 17 is accommodated for compression by the marginal edge 4 of the upper member 2 to provide a seal around the mold member 1. The members 7, 9 and 11 are maintained in assembled, stacked relation by bolts 17a, and the plate 14 is secured to the member 11 by screws 14a.

Figures 3, 4:
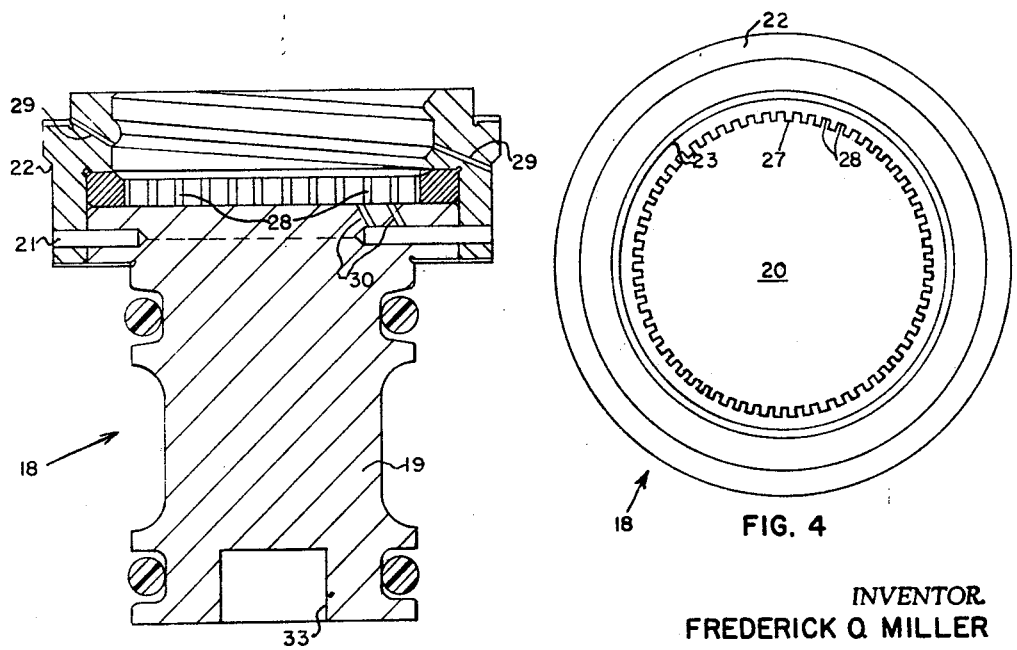
FIG. 3 is an enlarged, sectional view of a cavity-forming insert constructed in accordance with the invention.
FIG. 4 is a top plan view of the apparatus shown in FIG. 3.

A cavity-forming insert or body member 18 is rotatably accommodated in the bore 12 and comprises a generally cylindrical shank 18 having an upper surface 20 which is flat. Fixed to the shank 19 adjacent the upper end of the latter and by means of a pin 21 is an annular shell 22 having an inner wall 23 on which is formed a helical thread 24. The inner surface 23 is grooved as at 25 so as to provide an annular undercut or recess 26 between the surface 20 of the stem 19 and the undercut edge of the inner wall 23. The threaded portion of the shell wall 23 overhangs the groove 25. Rotatably fitted into the recess 26 is a ring or annulus 27 having a smooth outer surface, but having on its inner surface a plurality of axially extending, circumferentially spaced grooves 28. As is best shown in FIGS. 3 and 4, the radially inner surface of the ring 27 is radially inward of the shell wall 23.

The shell 22 has a plurality of air passages 29 and the shank 19 has a plurality of air passages 30 which establish communication between each of the mold cavities and a vacuum pump (not shown) via passages 31 in the member 11 so as to enable air to be evacuated from the cavities formed by the shells 22, as is conventional in vacuum molds.

Each member 18 is rotatable relatively to the mold member 11. To effect rotation of the member 18, the lower end of the shank 19 has a rectangular opening 33 therein for the accommodation of a correspondingly shaped driving lug 34 which projects from a drive shaft 35 that is journaled for rotation in the bore 10 by a bearing 36. The opposite end of the shaft 35 is keyed to a pinion 37 that is rotatably accommodated in the opening 8 of the lower member 7. The pinion 37 meshes with a toothed rack 38 that extends through a groove 39 formed in the member 7 so as to be reciprocable back and forth by means of any suitable driving mechanism (not shown).

To condition the apparatus for operation, the cover member 2 is raised to provide clearance between itself and the base member 1 sufficient to permit a heated sheet 3 of thermoplastic material to be accommodated between the mold members 1 and 2. The cover member 2 then may be lowered so as to clamp the sheet against the top plate 14 of the upper member 11. Air then may be evacuated from the cavities formed by the shells 22 so as to draw the plastic material into the cavities and into snug engagement with the inner surfaces thereof so as to deform the sheet 3 and provide a plurality of cup shaped caps 40, each of which remains attached to the sheet 3.

The cap 40 formed by the molding process has an end or closure wall 41 formed by the upper surface 20 of the stem 19 and upstanding therefrom an annular skirt 42 formed by the inner surface 23 of the shell 22 and by the inner surface of the ring 27. The skirt 42 thus has a helically threaded portion 43 corresponding to the thread 24, and adjacent the end wall 41, the skirt has an axially ribber portion 44 formed by the ribs 28 on the ring 27. The ribbed portion 44 comprises alternate lands 45 and grooves 46 which extend axially of the cap 40 and provide roughened surfaces which facilitate rotation of the cap 40 when it is applied to a container.

Following the vacuum drawing process, the cover 2 is raised to an elevated position out of engagement with the sheet 3 and the deformed plastic material is permitted to cool. The racks 38 then may be moved in such direction as to cause simultaneous rotation of the insert members 18 in such direction as to cause the caps 40 to be moved upwardly or out of the cavities. The attachment of the caps 40 to the undeformed portions of the sheet 3 prevents rotation of the caps 40. As each insert 18 is rotated, the ribs 28 on the ring 27 remain in engagement with the ribber portion 44 of the cap 40 and thus prevent rotation of the ring 27. Stated differently, the stem 19 and the shell 22 rotate, but the ring 27 remains stationary. As the cap moves upwardly out of the cavity, the ribs 45 of the ribbed portion 44 slide axially of the ring 27 until such time as the ring is free of the ribbed portion 44, whereupon continued rotation of the insert 18 ejects each cap 40 from its forming cavity.

Figure 6:
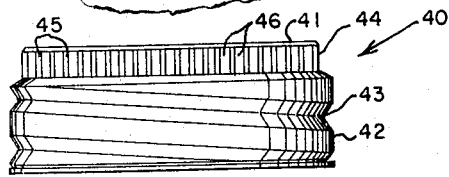
FIG. 6 is a side elevational view of the cap.

Following the deformation oft he sheet 3, and the removal of the formed caps from their respective cavities, the sheet may be transferred to a trimming station so as to trim the undeformed portions of the sheet from the deformed portions, thus resulting in a cap as ilusrated in FIG. 6.

Following the transfer of the deformed sheet, the racks 38 may be returned to their original positions so as to condition the apparatus for another cycle of operation.

This disclosure is representative of presently preferred methods and apparatus, but is intended to be illustrative rather than definitive of the invention. The invention is defined in the claims.

I claim:

1. A mold construction comprising a body member having a cavity therein defined by a base and an upstanding side wall, said side wall being peripherally grooved to form an undercut adjacent said base whereby the remaining portion of said side wall overhangs said groove, the remaining portion of said side wall being helically threaded; and an annulus accommodate in said groove for rotation relative to said body member, the radially inner surface of said annulus being grooved longitudinally of its axis of rotation, and said inner surface of said annulus being located radially inwardly of the threaded portion of said side wall.

2. The construction set forth in claim 1 including means mounting said body member for rotation.

3. The construction set forth in claim 2 including means for rotating said body member.

4. The construction set forth in claim 3 wherein said means for rotating said body member comprises gear means.

5. A mold construction comprising a base having a plurality of openings therein; a body member mounted in each of said openings for rotation about an axis, each of said body members having a cavity therein defined by a base and an upstanding, helically threaded side wall, said side wall of each of said cavities being grooved peripherally to form an undercut adjacent said base whereby the remaining portion of said side wall overhangs said groove; an annulus accommodated in each of said grooves for rotation relative to its associated body member, about said axis, the radially inner surface of each of said annuli being grooved longitudinally of said axis; and means for rotating each of said body members.

6. The construction set forth in claim 1 wherein the radially inner surface of each of said annuli is located radially inwardly of the remaining portion of the side wall of the associated cavity.

7. The construction set forth in claim 1 wherein said means for rotating each of said body members is operable to rotate all of said body members simultaneously.

References Cited

UNITED STATES PATENTS

| | | | |
|---|---|---|---|
| 382,206 | 5/1888 | Barrett et al. | 18—42 R |
| 1,944,571 | 1/1934 | Rahm | 18—17 R |
| 2,317,823 | 4/1943 | Strauss | 18—2 RS UX |
| 2,404,631 | 7/1946 | Gronemeyer | 18—2 RS UX |
| 2,808,620 | 10/1957 | Schmid et al. | 18—2 RS X |
| 3,418,691 | 12/1968 | Hanai | 18—19 P X |
| 3,481,000 | 12/1969 | Bärfuss | 18—2 RS X |

FOREIGN PATENTS

| | | | |
|---|---|---|---|
| 137,765 | 1961 | U.S.S.R. | 18—42 M |

J. SPENCER OVERHOLSER, Primary Examiner

M. O. SUTTON, Assistant Examiner

U.S. Cl. X.R.

18—2 RS, 19 F